Oct. 10, 1939.   E. S. BUCHANAN   2,175,514
SAW-GRINDING MACHINE
Filed Aug. 4, 1937   4 Sheets-Sheet 2

Inventor
~ Ethel S. Buchanan ~
by Bair & Freeman
Attorneys

Witness
H. S. Munzenmaier

Oct. 10, 1939.  E. S. BUCHANAN  2,175,514
SAW-GRINDING MACHINE
Filed Aug. 4, 1937  4 Sheets-Sheet 3
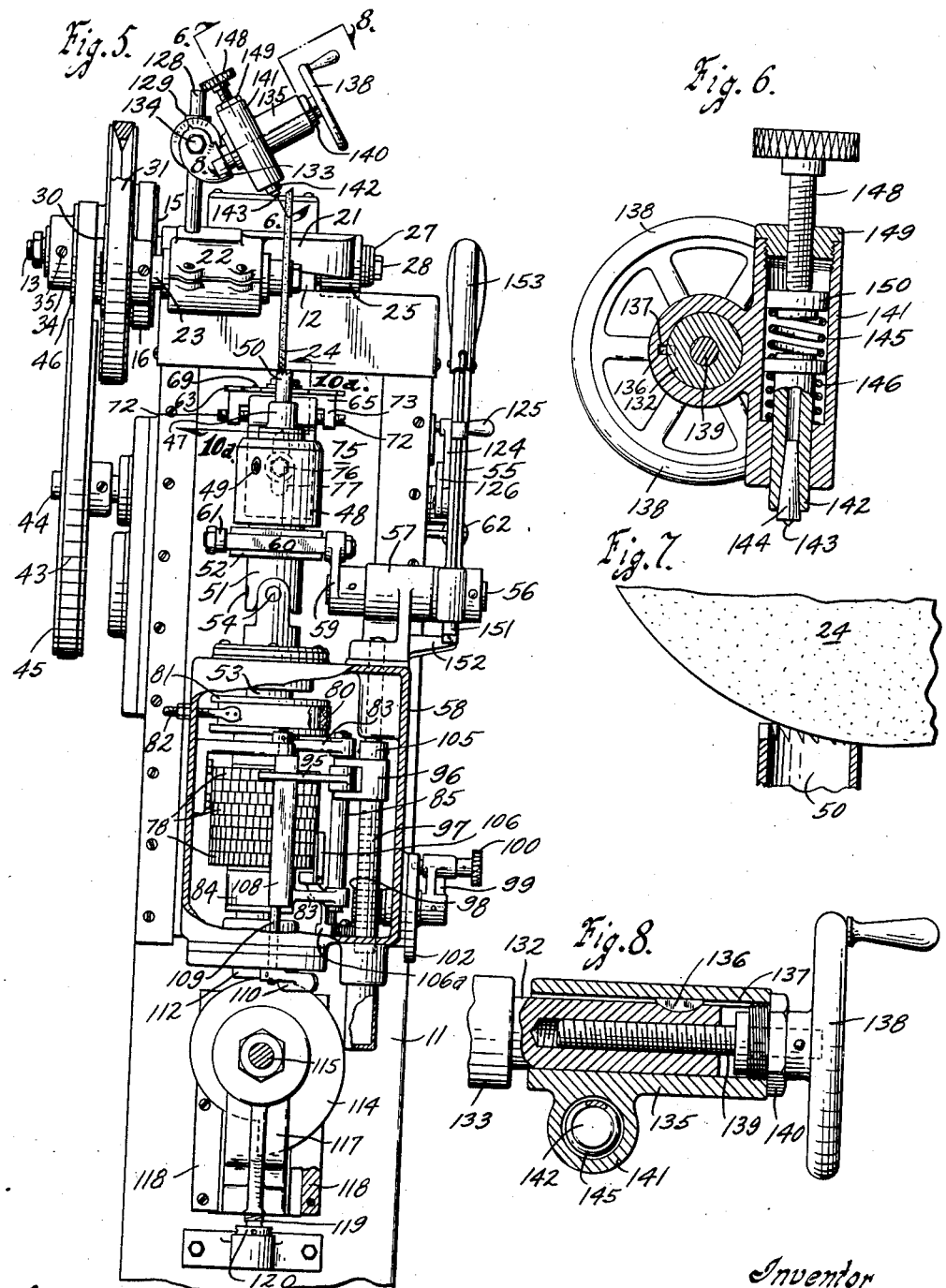

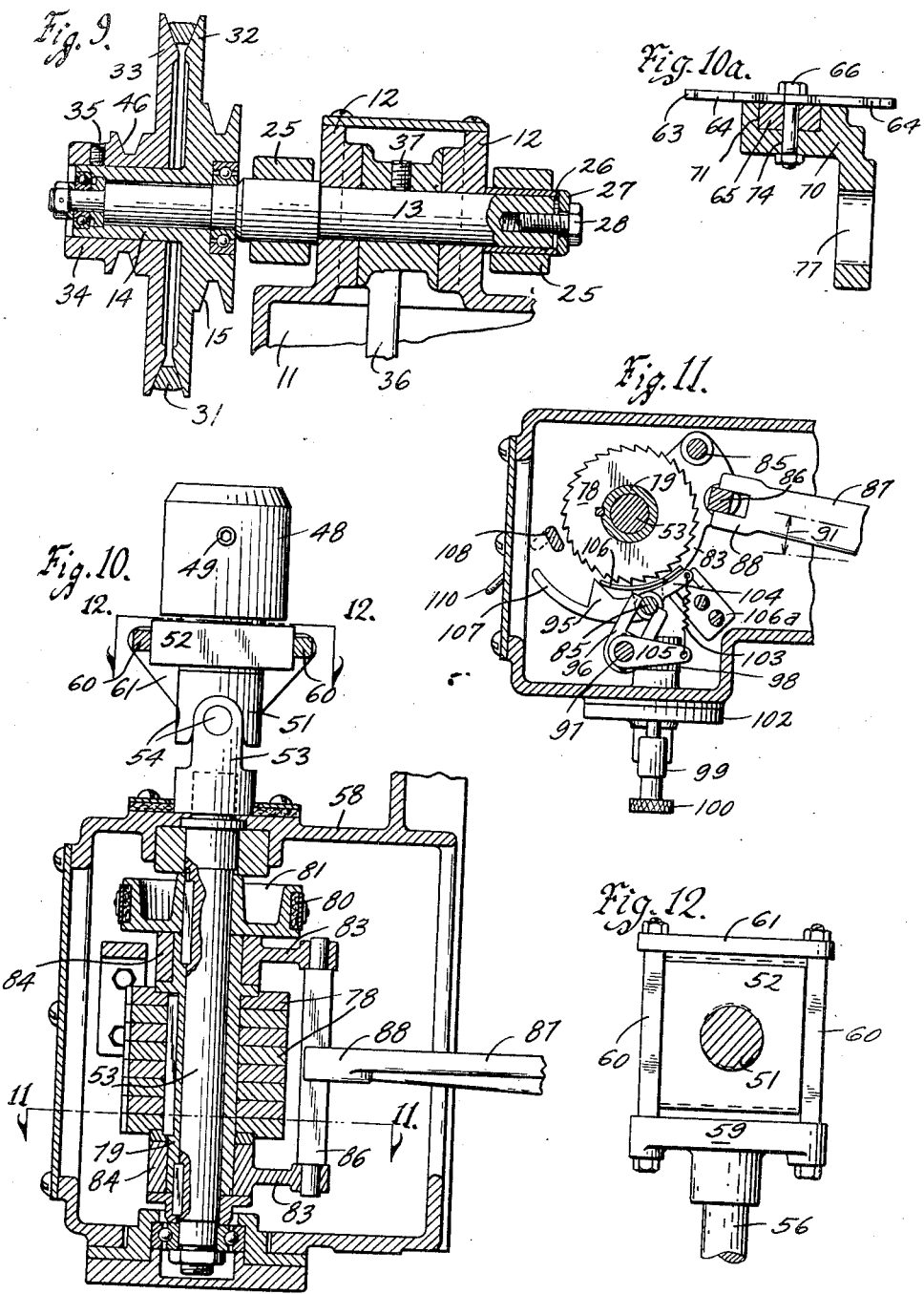

Patented Oct. 10, 1939

2,175,514

UNITED STATES PATENT OFFICE 2,175,514

SAW-GRINDING MACHINE

Ethel S. Buchanan, Iola, Kans., assignor to American Pearl Button Co., Washington, Iowa, a corporation of Iowa Application August 4, 1937, Serial No. 157,329

12 Claims. (Cl. 76—40)

An object of this invention is to provide a saw grinding machine which is universally adaptable for different sizes of saws such as tubular saws for button cutting operation and for saws having different numbers of teeth. The machine is also adjustable in a plurality of different ways to secure different sharpened teeth effects.

Another object is to provide a complete saw grinding machine including all the necessary mechanism for grinding different sizes of tubular saws.

Another object is to provide a saw grinding machine including a chuck which is mounted by means of a universal joint connection to a means for periodically rotating the chuck for successively sharpening the teeth around the periphery of the saw being held in the chuck, the universal joint connection permitting swinging of the chuck and the saw held thereby to a position spaced from the grinder where the saw can be readily removed and another one placed in position without interference of the grinder with the teeth of the saw during such saw changing operation.

Still another object is to provide means for automatically raising the grinder away from the teeth of the saw whenever the chuck for the saw is manipulated to an out-swung position for removal of the saw, the mechanism being so arranged, however, that when the saw chuck is returned to its normal position, the grinder is kept in a raised position until the operator lowers it by a separate operation, thus insuring that the teeth of a saw will not be damaged by swinging the saw to a position where the grinder will strike the teeth thereof before the saw has been properly positioned for sharpening purposes.

Another object is to provide in connection with a saw grinding machine, a steady rest for the saw which, in conjunction with the universal joint connection of the shaft which supports the saw chuck, permits lateral shifting of the saw relative to the grinder so that the axis of the saw may be placed on center relative to the face of the grinder to secure a right angle cutting edge for the teeth of the saw or placed off center to secure either an acute or obtuse cutting angle for the saw teeth.

A further object is to provide a plurality of ratchet wheels having different numbers of teeth and an actuating pawl for the wheels which can be selectively moved to a position coacting with any one of the wheels, the wheels being connected with the saw holding chuck for rotating it for successively sharpening the teeth thereof by the grinder.

A further object is to provide means for rendering the pawl mechanism inoperative if desired when changing saws and to design the machine in general so that in all respects it is safe and fool-proof to operate.

With these and other objects in view, the invention consists in the construction, arrangement and combination of the various parts of the saw grinding machine, whereby the objects contemplated are attained, as hereinafter more fully set forth, pointed out in my claims, and illustrated in the accompanying drawings, in which:

Figure 5 is an enlarged front elevation of the machine with part of the ratchet box broken away to show internal details of construction.

Figure 6 is an enlarged sectional view on the line 6—6 of Figure 5 showing a resilient mounting for the diamond holder of the grinder dresser.

Figure 7 is a sectional view through a saw being sharpened and showing the coaction of the grinder with the teeth thereof.

Figure 8 is an enlarged sectional view on the line 8—8 of Figure 5, showing the means for imparting traveling movement to the grinder dresser when dressing the grinder.

Figure 9 is an enlarged sectional view on the line 9—9 of Figure 1, showing the main shaft and the parts associated therewith.

Figure 10 is a vertical sectional view on the line 10—10 of Figure 4, showing further details of the ratchet and pawl mechanism.

Figure 10a is an enlarged sectional view on the line 10a—10a of Figure 5, showing details of construction.

Figure 11 is a sectional view on the line 11—11 of Figure 10, showing the pawl mechanism coacting with a pawl guard.

Figure 12 is a sectional view on the line 12—12 of Figure 10 showing a bearing and a cage therefor used for swinging the saw chuck to and from normal position.

Figure 13 is a view similar to a portion of Figure 1 showing a means for raising the grinder away from the saw teeth, such means being in operative position.

Figure 14 is a sectional view on the line 14—14 of Figure 1 showing the saw in central position relative to the face of the grinder for producing substantially right angle cutting edges; and Figures 15 and 16 are similar views showing the saw adjusted to the left and right for producing respectively acute and obtuse cutting edges on the teeth of the saw.

Figure 1:
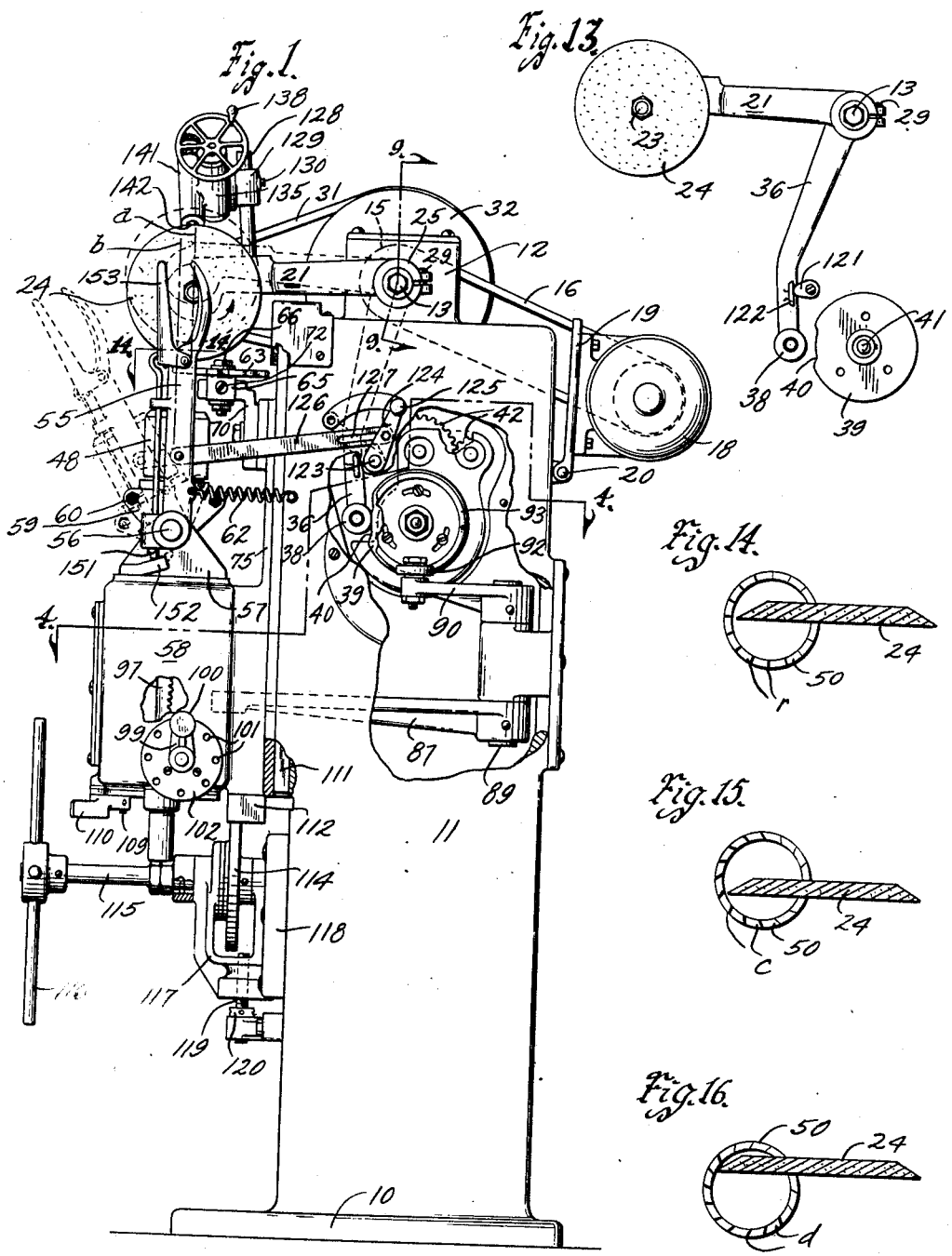
Figure 1 is a right hand side elevation of a saw grinding machine embodying this invention.
Figure 2:
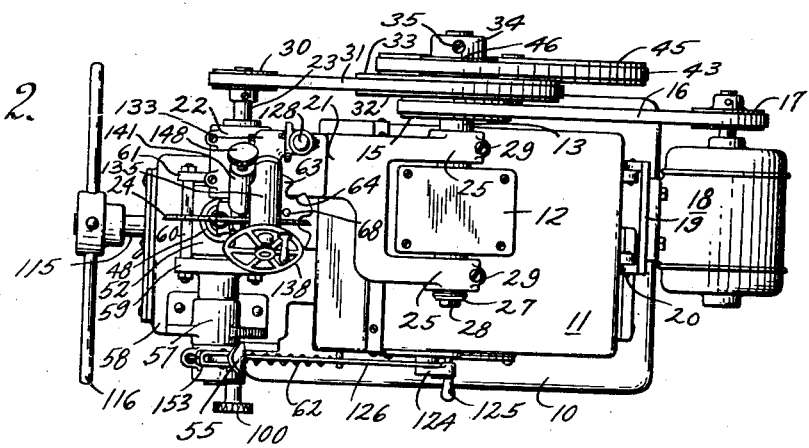
Figure 2 is a plan view of the same.

On the accompanying drawings the reference character 10 indicates a base of an upright frame 11. The frame 11 is box-like in character and has at its upper end a pair of bearings 12. Oscillatable in the bearings 12 is a main shaft 13.

Rotatably mounted on one end of the main shaft 13 is a sleeve 14 having a drive pulley 15 formed at one end thereof. The drive pulley 15 is driven by a belt 16 extending to a motor pulley 17.

The motor for the pulley 17 is indicated at 18 and, as shown in Figure 1, is mounted on a base 19. The base 19 is pivoted as at 20 to the upright frame 11 so that the weight of the motor 18 serves to keep the belt 16 tight.

A grinder supporting arm 21 is provided, having a bearing 22 at its outer end in which a grinder shaft 23 is journalled. A grinder or emery wheel 24 is mounted on the shaft 23.

The arm 21 at its inner end is yoke shaped and terminates in a pair of hubs 25 clamped on the shaft 13. End play of the shaft is taken up by a split sleeve 26, a washer 27 and a cap screw 28. The sleeve 26 is interposed between the shaft 13 and one of the hubs 25. For clamping the hubs 25 on the shaft 13 and the split sleeve 26, I provide clamp screws 29.

For driving the grinder 24, I provide on the grinder shaft 23 a pulley 30. This pulley is driven by a belt 31 from an adjustable pulley consisting of a pair of cone shaped plates 32 and 33 (see Figure 9). The plate 32 is formed on the sleeve 14 adjacent the drive pulley 15, while the plate 33 has a hub 34 slidable on the sleeve 14. A set screw 35 serves the purpose of retaining the plates 32 and 33 spaced as desired from each other. Obviously to tighten the belt 31, the plates may be moved closer together, and thus I provide a belt tightening means without the necessity of utilizing an idler pulley or the like, and the necessity for mounting such.

The arm 21, and consequently the grinder 24, may be raised or lowered by oscillating the shaft 13. For oscillating the shaft automatically, I provide an arm 36 secured thereto as by a set screw 37. The arm 36 depends from the shaft 13 and terminates in a roller 38. A cam 39 is adapted to normally coact with the roller 38 for holding the grinder raised most of the time, but permitting it to lower whenever a depression 40 in the cam 39 registers with the roller 38.

The cam 39 is mounted on a shaft 41 which is driven at a relatively low speed by step-down gearing 42 and a belt 43. One pinion of the gearing 42 is mounted on a shaft 44 on which is mounted a pulley 45. The pulley 45 is driven by the belt 43 from a pulley 46 formed on the sleeve 34.

Referring to Figure 5, a saw chuck 47 is illustrated which is removable relative to a chuck holder 48. The chuck holder has a set screw 49 to normally retain the chuck 47 in position. The chuck 47 is adapted to hold a saw 50 during the sharpening operation.

The chuck holder 48 is supported by a chuck holder shaft 51 which is journalled in a bearing 52. Below the bearing 52 a universal joint connection is provided between the shaft 51 and a saw rotating shaft 53. As illustrated, this connection includes a cross shaped trunnion element 54, whereby the shaft 51 may be adjusted at an angle relative to the shaft 53, but remains in operative connection therewith so that the saw can be rotated by the shaft 53.

The universal joint connection permits swinging of the saw and its chuck to a re-loading position shown by dotted lines in Figure 1. For swinging the chuck to this position, I provide a control lever 55. This lever is secured to a shaft 56 journalled in a bearing 57. The bearing 57 is mounted on a ratchet box 58.

A triangular shaped lever 59 is mounted on the inner end of the shaft 56. It carries a pair of square bars 60 which have a cross bar 61 at their free ends. The plate 59 and the bars 60 and 61, as shown in Figure 12, provide a cage for the bearing 52. The bearing 52 is rectangular in outline, and the cage is slightly wider than the width of the bearing so that the bearing can shift laterally relative to the cage for a purpose which will hereinafter appear.

Figure 3:
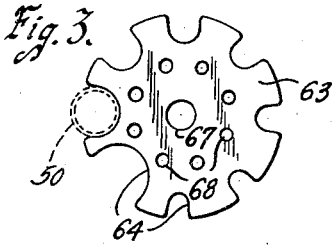
Figure 3 is an enlarged plan view of a steady rest used in this machine for engagement by the saw during the grinding operations on the teeth thereof.

The lever 55 is normally retained in the full line position shown in Figure 1 by a spring 62. The lever is stopped in this position by the saw 50 engaging a steady rest 63. This rest is shown in Figure 3 and consists of a disk having notches 64 in its periphery. The diameter of the notches are different sizes so that the disk can be rotated for fitting different sizes of saws. One of the saws is indicated at 50 by dotted lines, this being the position assumed by the saw under constraint of the spring 62.

The disk 63 is rotatably mounted on a supporting bar 65. For this purpose a clamp bolt 66 extends through a bore 67 at the center of the disk. Spaced from the bore 67 is a plurality of perforations 68 adapted to selectively coact with an index pin 69 (see Figure 5) projecting upwardly from the supporting bar 65. The bolt 66, of course, may be loosened and the disk rotated so that any desired notch 64 is outermost, whereupon the proper perforation 68 is caused to coact with the index pin 69 and the bolt 66 thereafter tightened for retaining the disk in its adjusted position.

The supporting bar 65 is laterally adjustable relative to an angle bracket 70. The angle bracket, as shown in Figure 10a, has a transverse groove 71 formed therein to receive the bar. For adjusting the bar 65 laterally as desired, a pair of set screws 72 is provided. These extend screw threadedly through depending ears 73 at the ends of the bar and engage opposite sides of the angle bracket 70. The bracket 70 below the groove 71 is provided with a transverse slot 74 to permit movement of the clamp bolt 66 during such lateral adjustment of the supporting bar and the steady rest 63.

The bracket 70 is mounted on an upwardly extending base 75 of the ratchet box 58. It is vertically adjustable relative thereto by means of a cap screw 76 extending through a vertical slot 77 of the bracket 70 (see Figures 1 and 5).

Within the ratchet box 58 a plurality of ratchet wheels 78 are keyed to a sleeve 79 which in turn is keyed to the shaft 53 (see Figure 10). Free rotation of the ratchet wheels and the shaft is prevented by a brake band 80. The band 80 extends around a brake drum 81 on the shaft 53 and its ends are adjustably connected to a wall of the ratchet box 58 by eye bolts 82.

For rotating the ratchet wheel I provide a cage arrangement consisting of upper and lower plates 83 having hubs 84 oscillatably mounted on the sleeve 79. The plates 83 are connected together by a pair of spacer rods 85 and support a square bar 86 having its ends journalled in the plates.

The bar 86 is made to oscillate relative to the axis of the shaft 53 by an arm 87 having a yoke end 88 slidably receiving the square portion of the bar 86. The arm 87 is secured to a vertically arranged rock shaft 89 to which is also secured an operating arm 90. The arm 90 carries a roller 92 for coaction with a cam 93. A spring 94 normally retains the roller 92 engaged with the cam 93. The raised portion of the cam rotates the cage including the plates 83 in a clockwise direction as viewed from the top, while the depression in the cam permits the spring 94 to rotate it counter-clockwise, the throw being indicated by an arrow 91.

On one of the tie rods 85 I slidably and oscillatably mount a pawl 95. This pawl is adapted to coact with the teeth of any of the various ratchet wheels 78. In order to select which ratchet wheel it is to coact with, I provide a yoke 96 carried by a rod 97. The rod 97 is vertically slidable relative to the ratchet box 58 and is provided with rack teeth along its rear surface. Meshing with the rack teeth is a pinion 98 which may be rotated by a lever 99 to any one of a plurality of different positions.

The lever 99 carries a spring latch pin 100 to selectively coact with any of the perforations 101 of an index disk 102. By adjusting the lever 99, the rack rod 97 may be raised or lowered, and consequently the pawl 95 made to coact with any desired ratchet wheel 78. To urge the pawl 95 into engagement with the teeth of the ratchet wheels, I provide a spring 103. It has one end connected to a tail piece 104 of the pawl 95, and its other end connected to an arm 105 extending from the rack rod 97.

The travel of the pawl 95, of course, is great enough to move the upper ratchet wheel 78 which has the coarsest teeth a distance of one tooth. Accordingly it can also move others of the ratchet wheels the distance of one tooth, even though its travel is greater than such distance. On the lower three ratchet wheels, however, it would move them more than one tooth at a time, and I accordingly provide a guard 106 over a portion of these teeth. This guard, as shown in Figure 11, services the purpose of raising the pawl 95 from the ratchet teeth so that it cannot click over two of them at a time, and is supported by a bracket 106a.

Figure 4:
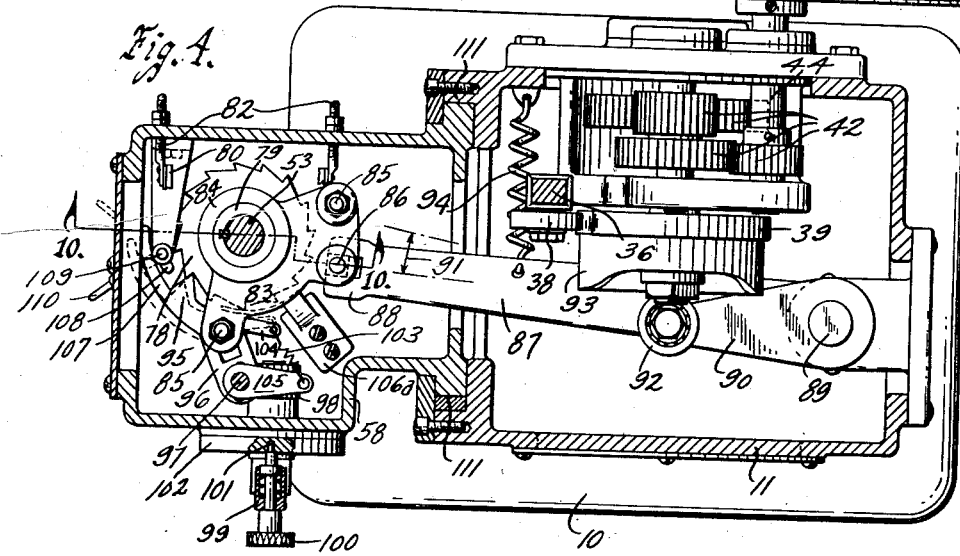
Figure 4 is an enlarged sectional view on the line 4—4 of Figure 1 and illustrates particularly a ratchet and pawl mechanism and the driving mechanism therefor.

The pawl 95 also has an extension 107 adapted for a cam wing 108 to coact therewith, as shown by dotted lines in Figure 4, when it is desired to prevent the ratchet mechanism from operating to rotate the saw. The cam wing 108 is carried by a shaft 109 extending out of the lower end of the ratchet box 58. An operating wing 110 is secured to the shaft for oscillating it to either the inoperative position shown by solid lines or the operative position shown by dotted lines.

The ratchet box 58 is vertically movable relative to the upright frame 11. As shown in Figure 4, guideways 111 are provided for the side edges of the back wall of the box. The box has a cam block 112 resting on a cam 114. The cam 114 is secured to a shaft 115 on the outer end of which an operating wheel 116 is provided. This wheel is merely a spoked hub to provide a convenient means for manually rotating the shaft 115.

The shaft 115 is journalled in a yoke 117 which in turn is vertically slidable relative to the frame 11. Guideways 118 are provided for mounting the yoke on the frame. The entire yoke and cam assembly may be vertically adjusted by rotating a screw threaded rod 119. This rod has a collar 120 provided with peripheral perforations in which a rod may be thrust for rotating the threaded rod 119, and consequently adjusting the yoke 117 whenever extreme movement of the cam 114 is insufficient for positioning the chuck 47 in accordance with the length of the saw being sharpened.

In addition to the cam 39 being operable to raise the grinder 24, I provide a cam 121 cooperable with a projection 122 of the lever 36. The cam 121 is carried by a rock shaft 123 on the outer end of which is a lever 124. This lever is adapted to be locked in either the full line position or the dotted line position of Figure 1 by a spring urged latch pin 125.

A link 126 operatively connects the control lever 55 with the lever 124. A lost motion connection is provided with the link and the lever 124, which includes a slot 127 in the link.

In connection with this machine there is provided a dresser for the emery wheel 24, which includes an upstanding post 128 on the emery wheel bearing 22. A hub 129 is vertically slidable relative to the post 128 and normally locked thereto by a set screw 130. A supporting rod 132 has a head 133 which is clamped at any desired angle to the hub 129 by a clamp screw 134. The axis of the support 132 must be parallel to the face of the grinder 24, to be dressed, as illustrated in Figure 5.

Slidably mounted on the support 132 is a head 135. This head is made non-rotatable relative to the support 132 by means of a key 136 in a keyway 137. Movement of the head 135 back and forth along the support 132 is accomplished by rotating a hand wheel 138. The hand wheel 138 is secured to a screw threaded rod 139 which is rotatably and non-slidably mounted relative to a nut 140. The rod 139 is threaded into the support 132.

The head 135 has a sleeve 141 at its side in which is slidably mounted a diamond holder 142. The diamond holder 142 supports the diamond illustrated at 143 which is mounted in a tapered sleeve 144. The diamond holder 142 is slidably or floatingly mounted relative to the sleeve 141, and also resiliently mounted relative thereto between a pair of springs 145 and 146. The diamond holder has a flange 147 between the springs whereby movement of the diamond holder in either direction must be in opposition to one of the springs.

The tension of the springs may be adjusted by a thumb screw 148. This screw is threaded through a closure nut 149 of the sleeve 141 and engages a follower 150 behind the spring 145

*Practical operation*

In the operation of my saw grinding machine, the motor 18 may be in operation and consequently the grinder 24 rotating. The cams 39 and 93 will also be in operation for periodically raising the grinder and rotating the saw 50 a portion of a revolution, the degree of which depends upon with which ratchet wheel 78 the pawl 95 is coacting. To insert a saw in the chuck 47, the lever 55 is grasped and swung forwardly to the dotted position of Figure 1 after the latch pin 125 of the arm 124 has been withdrawn. This will cause the cam 121 to coact with the projection 122, as shown in Figure 13, and raise the grinder to the position shown in this figure, and also by dotted lines in Figure 1. Thus the grinder will not interfere with the teeth of any saw mounted in the saw chuck.

When the dotted position 55 of the lever is reached, a latch 151 carried by the lever 55 will drop behind a stop lug 152 for keeping the saw chuck in its re-loading position. When in this position, the saw will continue to rotate periodically due to the operation of the pawl and ratchet means unless it is desirable to stop such rotation. In order to do this, the wing 110 at the bottom of the ratchet box 58 is swung to the left so that the cam wing 108 will be engaged by the pawl extension 107, and thus the pawl will be prevented from engaging any of the ratchet teeth.

After the saw is placed in the chuck, the latch 151 may be unlatched by pressing on a lever 153, and then the control lever 55 permitted to swing to its full line position of Figure 1. In this position, the spring 62 retains the saw 50 engaged with the steady rest 63. The ratchet and pawl action may now be started by swinging the wing 110 to the right and the grinder then permitted to lower to the sharpening position by unlatching the pin 125 and swinging the lever 124 clockwise. The lost motion connection provided by the slot 127 permits the arm 124 to remain in the dotted position of Figure 1 until the arm is unlatched in this manner and swung to the right. The depth of the grinding operation can be regulated, of course, by raising or lowering the ratchet box 58 by manipulating the hand wheel 116.

With the saw chuck in a central position relative to the right hand face of the grinder 24, as shown in Figure 14, the cutting edge of the teeth will be at substantially right angles to the circumference of the saw. If this angle is to be acute or obtuse, however, the saw may be shifted to either the left or right, as shown in Figures 15 and 16, this being accomplished by manipulating the clamping bolt 66 and the set screws 72 in an obvious manner. This will swing the chuck shaft 51 to the left or right but the universal joint connection at 54 permits of such swinging without binding and will maintain an operative connection between the saw chuck and the pawl and ratchet mechanism. This is particularly desirable for buttons of different composition where the saw, when having teeth sharpened acutely, will operate better on some buttons than when the teeth are sharpened obtusely and vice versa. The lost motion provided in the cage 59—60—61, as illustrated in Figure 12, also permits of such lateral shifting of the saw, one position of the shift being shown by dotted lines. At the same time the cage for the bearing 52 so cooperates with the bearing that the saw chuck can be readily swung outwardly to a position where the saw does not interfere with the grinder when changing saws.

The axis of the grinder in Figure 1 is closer to the machine than the axis of the saw. These axes are indicated at $a$ and $b$ respectively. This is so that, as shown in Figure 7, the grinder 24 will grind the teeth of the saw next to the machine without striking the teeth away from the machine. This also grinds the bottom of the teeth at a slightly outwardly sloping angle. This provides better clearance for the saw dust when the saw is in use.

When the corner of the grinder 24 becomes rounded, it is necessary to dress the grinder so that the bottoms of the teeth in the saw may be properly formed. This is accomplished by adjusting the damond 143 to the proper position either by rotating the thumb screw 148 or shifting the hub 129 vertically on the support 128. The hand wheel 138 is then first rotated in one direction and then in the other for feeding the diamond across the face of the grinder to be dressed. During this operation, the floating mounting of the diamond holder will prevent any breakage of the diamond as if the pressure of the diamond against the grinder is excessive, the spring 145 will be compressed. This is a very valuable feature in connection with economy of operation, as a rigidly mounted diamond, if adjusted to dress the grinder too deeply, may be broken and have to be replaced.

The elongated character of the square rod 86 in the ratchet box 58 permits vertical adjustment of the ratchet box, and yet proper operation of the pawl moving mechanism from the arm 87, (which does not move vertically) is had. Also the cam wing 108 is elongated so that it may properly cooperate with the extension 107 of the pawl 95 regardless of the position of vertical adjustment of the pawl, for coaction with the various ratchet wheels 78. All adjustments of the various parts of the machine are readily and easily made, thus enabling the operator to quickly set up the machine for any diameter or length of saw, and thus reducing the labor necessary for saw sharpening operations to a minimum.

Some changes may be made in the construction and arrangement of the parts of the device without departing from the real spirit and purpose of the invention, and the claims are intended to cover any modified forms of structure or use of mechanical equivalents which may be reasonably included within their scope.

I claim as my invention:

1. In a saw sharpening machine, a chuck for holding a saw, a grinder for sharpening the teeth of the saw, means for periodically rotating said chuck and saw through a portion of a revolution, said means comprising a plurality of ratchet wheels having different numbers of teeth, a pawl for actuating said ratchet wheels, a guide element for said pawl, means for imparting movement in alternately opposite directions to said guide element and thereby to said pawl and means for shifting said pawl along said guide element to co-act with the ratchet wheel having its number of teeth corresponding to the number of teeth in the saw being sharpened, said last means comprising a slidable mounted rack, a pinion coacting with the teeth thereof and a fork carried by said rack, engaging said pawl to impart such shifting movement thereto when said pinion is rotated and thereby sliding movement is imparted to said rack.

2. In a saw grinding machine, a chuck for holding a saw, a grinder for sharpening the teeth of the saw, means for periodically rotating said chuck and saw through a portion of a revolution, means for moving said grinder to tooth sharpening position after each chuck and saw rotating movement and for retracting said grinder from the saw after a tooth is sharpened, a universal joint connection between said chuck and the means for rotating it and means for swinging said chuck and saw about said universal joint connection to a position permitting insertion of a saw without interference with said grinder, said swinging means being operatively connected with said grinder to move it to retracted position when the chuck and saw are swung to said position permitting insertion of the saw.

3. In a saw grinding machine, a chuck for holding a tubular saw, a grinder for sharpening the teeth of the saw, means for periodically rotating said chuck and saw through a portion of a revolution, a universal joint connection between said chuck and the means for rotating it and means for swinging said chuck and saw about said universal joint connection to a position permitting insertion of a saw without interference with said grinder, said last means being operatively connected with said grinder to raise it to a position above the teeth of the saw when the chuck and saw are swung to said position permitting insertion of the saw and means for retaining said grinder in raised position until after said chuck and saw have been returned to sharpening position.

4. In a saw grinding machine, a chuck for holding a tubular saw, a grinder for sharpening the teeth of the saw, means for periodically rotating said chuck and saw through a portion of a revolution, a steady rest for said saw, said steady rest being shiftable for moving said saw to positions in which its axis is centered or off-center relative to the face of said grinder whereby to give the advance cutting edge of the saw teeth a right, acute or obtuse cutting angle as desired.

5. In a saw grinding machine, a chuck for holding a tubular saw, a grinder for sharpening the teeth of the saw, means for periodically rotating said chuck and saw through a portion of a revolution, a steady rest for said saw, said steady rest comprising a rotatable disk having notches of different diameters in its periphery to receive saws of different diameters, each of said notches being related to the center of rotation of said disk so that they hold their respective saws at the same axial position and means for mounting said steady rest rigidly with the desired notch in position to receive the saw.

6. In a saw grinding machine, a chuck for holding a saw, a grinder for sharpening the teeth of the saw, means for periodically rotating said chuck and saw through a portion of a revolution, a universal joint connection between said chuck and the means for rotating it and means for swinging said chuck and saw about said universal joint connection to a position permitting insertion of a saw without interference with said grinder, said means comprising a bearing for said chuck, a cage for said bearing, means for swinging said cage, said bearing being shiftable laterally of said cage to position the saw relative to the grinder.

7. In a saw grinding machine, a chuck for holding a tubular saw, a grinder for sharpening the teeth of the saw, means for periodically rotating said chuck and saw through a portion of a revolution, a universal joint connection between said chuck and the means for rotating it and means for swinging said chuck and saw about said universal joint connection to a position permitting insertion of a saw without interference with said grinder, said means comprising a bearing for said chuck, a cage for said bearing, means for swinging said cage, and means for adjusting said chuck laterally, said bearing being movable relative to said cage to permit such lateral adjustment of said chuck.

8. In a saw grinding machine, a chuck rotating shaft and a chuck shaft having a universal joint connection with each other, a chuck carried by said chuck shaft for holding a saw, a grinder for sharpening the teeth of the saw, a cam, means for rotating said cam, said cam periodically raising said grinder from the teeth of the saw, a second cam operatively connected with said means for rotating said first cam, said second cam periodically rotating said chuck rotating shaft a portion of a revolution, said chuck shaft being swingable about the universal joint connection to a position permitting insertion of a saw thereinto without interfering with said grinder and means of inter-connection between said shaft and grinder to raise said grinder from saw tooth engaging position when said chuck shaft is swung to saw insertion permitting position.

9. In a saw grinding machine, a chuck rotating shaft and a chuck shaft having a universal joint connection with each other, a chuck carried by said chuck shaft for holding a saw, a grinder for sharpening the teeth of the saw, a cam, means for rotating said cam and thereby periodically raising said grinder from the teeth of the saw, second cam operatively connected with said means for periodically rotating said saw chuck shaft a portion of a revolution, said chuck shaft being swingable about said universal joint connection to a position permitting insertion of a saw therein without interference with said grinder and means of inter-connection between said shaft and grinder to raise said grinder when said chuck shaft is swung to such position, said means of inter-connection including a lost motion connection which permits return of said chuck shaft to normal position without returning said grinder to tooth engaging position.

10. In a saw grinding machine, a chuck for holding a saw, means for rotating said chuck, a grinder for sharpening the teeth of the saw, a universal joint connection between said chuck and the means for rotating it, and means for swinging said chuck and saw about said universal joint connection to a position permitting insertion of a saw without interference of said grinder, an operative connection between said swinging means and said grinder to move the grinder to retracted position when the chuck and saw are swung to said position permitting insertion of the saw.

11. In a saw grinding machine, a chuck for holding a saw, a grinder for sharpening the teeth of the saw, means for moving said chuck and saw to a position permitting insertion of a saw without interference of said grinder, an operative connection between said last means and said grinder to move the grinder to retracted position when the chuck and saw are swung to said position permitting insertion of the saw.

12. In a saw grinding machine, a chuck rotating shaft and a chuck shaft having a universal joint connection with each other, a chuck carried by said chuck shaft for holding the saw, a grinder for sharpening the teeth of the saw, said chuck shaft being swingable about the universal joint connection to a position permitting insertion of a saw thereinto without interfering with said grinder, and means of interconnection between said chuck shaft and grinder to raise said grinder from saw-tooth-engaging position when said chuck shaft is swung to saw-insertion-permitting position.

ETHEL S. BUCHANAN.